United States Patent
Yang et al.

(10) Patent No.: US 10,643,438 B1
(45) Date of Patent: May 5, 2020

(54) CARD SKIMMING PREVENTION DEVICE

(71) Applicant: XANDAR KARDIAN, Seoul (KR)

(72) Inventors: Sun Jong Yang, Gangwon-do (KR); Jeong Woo Choi, Seoul (KR)

(73) Assignee: XANDAR KARDIAN, Seoul (KR)

( * ) Notice: Subject to any disclaimer, the term of this patent is extended or adjusted under 35 U.S.C. 154(b) by 0 days.

(21) Appl. No.: 16/437,051

(22) Filed: Jun. 11, 2019

(30) Foreign Application Priority Data

Oct. 16, 2018 (KR) .......................... 10-2018-0123169

(51) Int. Cl.
*G06Q 40/00* (2012.01)
*G07F 19/00* (2006.01)

(52) U.S. Cl.
CPC .................................. *G07F 19/209* (2013.01)

(58) Field of Classification Search
CPC .. G07F 19/2055; G07F 19/209; G07F 19/205; G06K 13/0875; G06K 13/08; G06K 7/082; G06K 7/084; G06K 7/0004; G06K 7/0056; G06K 7/081; G06K 7/087; G06Q 20/1085; G06Q 20/341; H04K 2203/20; H04K 3/00; H04K 3/822
See application file for complete search history.

(56) References Cited

U.S. PATENT DOCUMENTS

| 2007/0057070 A1* | 3/2007 | Scarafile ................ G06K 7/084 235/475 |
| 2007/0158432 A1* | 7/2007 | Tadamasa .............. G06K 13/08 235/480 |
| 2013/0299582 A1* | 11/2013 | Ozawa ................ G06K 7/0091 235/440 |
| 2014/0372305 A1 | 12/2014 | Ray et al. |
| 2016/0162712 A1* | 6/2016 | Ozawa ................... G06K 7/084 235/440 |
| 2016/0232385 A1* | 8/2016 | Takeda ................ G07F 19/2055 |
| 2017/0061167 A1* | 3/2017 | McNicoll ........... G06K 13/0875 |
| 2017/0351880 A1* | 12/2017 | Ozawa ............... G07F 19/2055 |

(Continued)

FOREIGN PATENT DOCUMENTS

| EP | 1394728 A1 | 3/2004 |
| JP | 2010-250711 A | 11/2010 |

(Continued)

OTHER PUBLICATIONS

Allowed claims for Korean Publication No. 10-1966171 dated Apr. 1, 2019, 15 pages.

(Continued)

*Primary Examiner* — Thien M Le
(74) *Attorney, Agent, or Firm* — Paul D. Bianco; Fleit Intellectual Property Law

(57) ABSTRACT

A card skimming prevention device according to an embodiment of the present invention is provided. The card skimming prevention device includes a sensor unit detecting a movement of an object inserted into or ejected from a card slot of an automated teller machine and a user who inserts the object, and a control unit determining whether or not a card skimmer is inserted into the card slot on the basis of whether or not the object is ejected after the object is inserted, wherein the sensor unit detects whether the object is inserted into the card slot or ejected from the card slot via a distance from the object.

12 Claims, 4 Drawing Sheets

(56) References Cited

U.S. PATENT DOCUMENTS

2017/0372144 A1    12/2017   Kurita et al.
2018/0060578 A1     3/2018   Kim

FOREIGN PATENT DOCUMENTS

| | | |
|---|---|---|
| JP | 2014182643 A | 9/2014 |
| JP | 2016170496 A | 9/2016 |
| KR | 10-2012-0012409 A | 4/2013 |

OTHER PUBLICATIONS

Final Office Action from Korean Patent Office dated Mar. 7, 2019 for Korean Application No. 10-2018-0123169, 4 pages.
First Office Action from Korean Patent Office dated Dec. 13, 2018 for Korean Application No. 10-2018-0123169, 9 pages.
Notice of Allowance from Korean Patent Office dated Mar. 26, 2019 for Korean Application No. 10-2018-0123169, 2 pages.
European Search Report dated Dec. 18, 2019 for Application No. 19180241.2.

* cited by examiner

FIG. 3
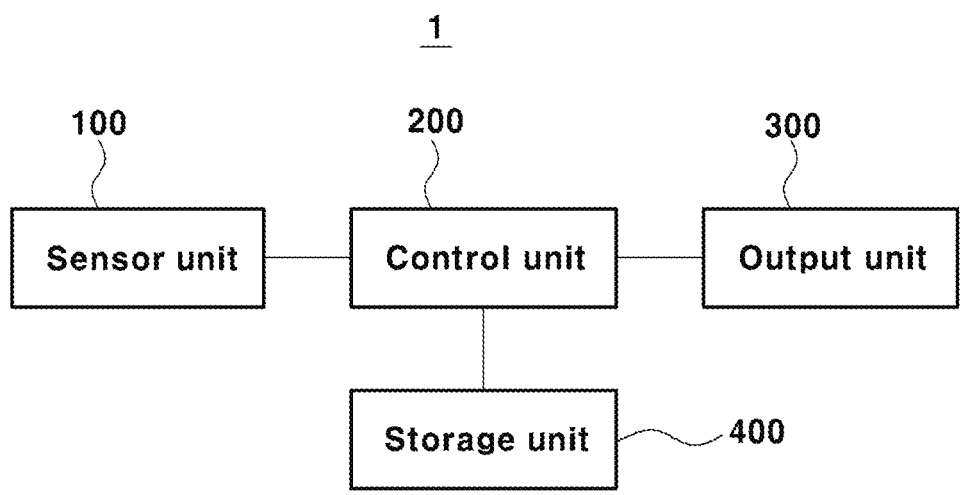
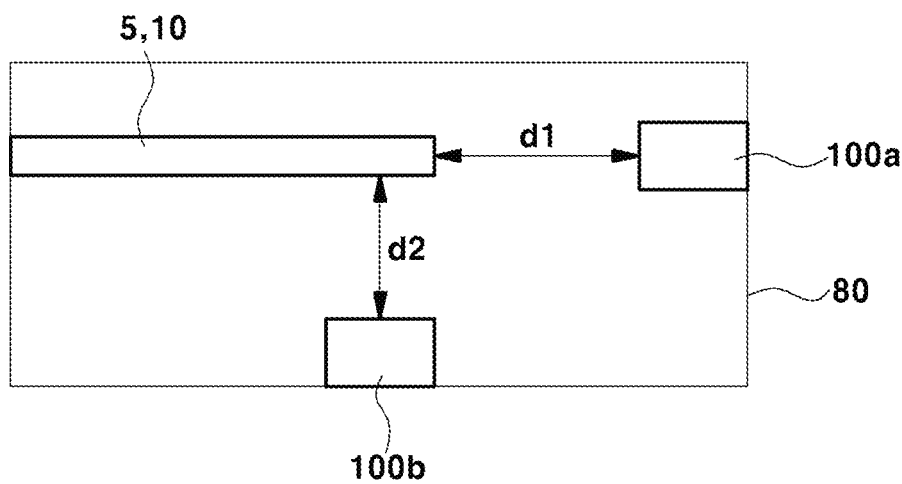
FIG. 4

CARD SKIMMING PREVENTION DEVICE

CROSS REFERENCE TO RELATED APPLICATION

The present application claims priority to Korean Patent Application No. 10-2018-0123169, filed Oct. 16, 2018, the entire contents of which is incorporated herein for all purposes by this reference.

BACKGROUND OF THE INVENTION

Field of the Invention

The present invention relates to a card skimming prevention device capable of detecting via a radar sensor whether a card skimmer is attached to an automated teller machine.

Description of the Related Art

An automated teller machine (ATM) is an automated device that provides basic financial services such as deposits or withdrawals at any time and place in connection with financial services. The automated teller machine is configured so that users can directly carry out financial transactions such as depositing, withdrawing, and transferring cash using a card or a bankbook.

Such automated teller machines are installed in various places other than banks. Recently, illegal behavior of attaching a card skimmer to a card slot of the automated teller machine thereby finding out card information of the user and then skimming the card using the same has occurred often. The use of such skimmed card information may cause financial damage to a user.

It is difficult for the user to easily recognize that the card skimmer is attached to the automated teller machine, and it may take a lot of time for an administrator who manages the automated teller machine to check a large number of automated teller machines. In addition, in the case of the card skimmer inserted into the card insertion portion, it is difficult to check that the card skimmer is attached to the automated teller machine when viewed from the outside.

SUMMARY OF THE INVENTION

The present invention has been made keeping in mind the above problems occurring in the related art, and an object of the present invention is to provide a card skimming prevention device capable of detecting a card skimmer that is attached to an automated teller machine or inserted into a card slot of the automated teller machine.

In order to accomplish the above object, a card skimming prevention device according to an embodiment of the present invention is provided. The card skimming prevention device includes a sensor unit detecting a movement of an object inserted into or ejected from a card slot of an automated teller machine and a user who inserts the object, and a control unit determining whether or not a card skimmer is inserted into the card slot on the basis of whether or not the object is ejected after the object is inserted, wherein the sensor unit detects whether the object is inserted into the card slot or ejected from the card slot via a distance from the object.

According to an example, the control unit may determine that the object is the card skimmer when the user is not detected in front of the automated teller machine while the object is not ejected from the card slot.

According to an example, the control unit may determine that the object is a card when the object is ejected from the card slot.

According to an example, the sensor unit may detect a first user located in front of the automated teller machine when inserting a first object and detect that a second user inserts a second object into the card slot in a state that the first object is not ejected, and the control unit may determine that the first object is the card skimmer when the second object is inserted into the card slot.

According to an example, the sensor unit may be disposed inside the automated teller machine, and the sensor unit is disposed in a direction in which the object is inserted.

According to an example, the sensor unit may be disposed inside the automated teller machine, and the sensor unit may be disposed inside the automated teller machine at a height lower than a height at which the object is inserted.

According to an example, the sensor unit may detect that the card skimmer is attached to the card slot of the automated teller machine, and the control unit may compare a signal reflected by the card slot with a signal reflected by the card skimmer to determine whether or not the card skimmer is attached.

According to an example, the card skimming prevention device may further include a storage unit storing information on a pattern of the signal reflected by the card slot, wherein the control unit analyzes the signal reflected by the card skimmer that is detected to be attached to the card slot by the sensor unit, on the basis of the information stored in the storage unit.

According to an example, the card skimming prevention device may further include a storage unit storing at least one of a minimum time to use the automated teller machine, information on a signal pattern obtained by detecting a person passing in front of the automated teller machine, and information on a signal pattern obtained by detecting a plurality of persons waiting to use the automated teller machine, wherein the control unit may determine the user using the automated teller machine on the basis of the information stored in the storage unit.

According to an example, the control unit may analyze the movement of the object spaced at a first distance from the sensor unit and a movement of the user spaced at a second distance from the sensor unit to determine whether or not the object is the card skimmer, and the second distance may be longer than the first distance.

According to an example, the sensor unit may include a first sensor unit detecting the movement of the object and a second sensor unit detecting a movement of the user.

According to an example, the sensor unit may include at least one of an impulse-radio ultra-wideband (IR-UWB) communication sensor, a Lidar, a frequency modulated continuous wave (FMCW) radar, and a Doppler radar.

According to an example, the card skimming prevention device may further include an output unit outputting a warning message when the control unit determines that the object is the card skimmer.

According to an embodiment of the present invention, an object inserted into a card slot can be detected using a radar sensor, and whether the object inserted into the card slot is a card or a card skimming device can be determined on the basis of stored information. Therefore, it is possible to prevent the card skimming device from being attached to the ATM in advance, thereby preventing financial damage to a user.

In addition, the card skimming prevention device according to an embodiment of the present invention can be easily implemented using a radar sensor, and accordingly operated at a low power and realized at a low cost.

Further, according to the card skimming prevention device of an embodiment of the present invention, it is possible to detect the card skimmer inserted into the card slot without visual confirmation.

In addition, according to an embodiment of the present invention, the card skimming prevention device can receive the radar signal reflected by the interface between the card slot and the air to determine whether or not the card skimmer is attached to the card slot.

BRIEF DESCRIPTION OF THE DRAWINGS

The above and another objects, features and other advantages of the present invention will be more clearly understood from the following detailed description when taken in conjunction with the accompanying drawings, in which:

FIG. 3 is a block diagram illustrating a card skimming prevention device according to an embodiment of the present invention;

FIG. 4 is a view illustrating the arrangement of a sensor unit according to an embodiment of the present invention;

DETAILED DESCRIPTION OF THE INVENTION

Figure 1:
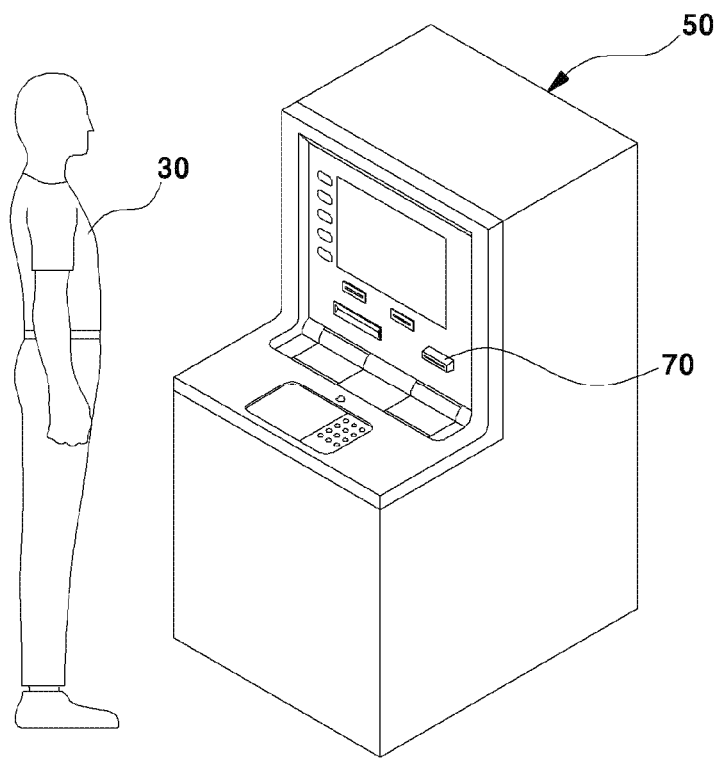
FIG. 1 is a view illustrating an automated teller machine in which a card skimming prevention device is housed according to an embodiment of the present invention.

The advantages and features of the present invention and the manner of achieving them will become apparent with reference to the embodiments described in detail below with reference to the accompanying drawings. The present invention may, however, be embodied in many different forms and should not be construed as limited to the embodiments set forth herein. Rather, these embodiments are provided so that this disclosure will be thorough and complete, and will fully convey the concept of the invention to those skilled in the art. Furthermore, the present invention is defined only by the scope of claims. Like reference numerals refer to like elements throughout the specification.

In addition, the embodiments described herein will be described with reference to cross-sectional views and/or plan views, which are ideal illustrations of the present invention. In the drawings, the thicknesses of the films and regions are exaggerated for an effective explanation of the technical content. Thus, the shape of the illustrations may be modified by manufacturing techniques and/or tolerances. Accordingly, the embodiments of the present invention are not limited to the specific shapes shown, but also include changes in shapes that are produced according to the manufacturing process. For example, the etching regions shown at right angles may be rounded or may have a shape with a certain curvature. Thus, the regions illustrated in the figures have schematic attributes, and the shapes of the regions illustrated in the figures are intended to illustrate specific types of regions of the elements and are not intended to limit the scope of the invention.

Figure 2:
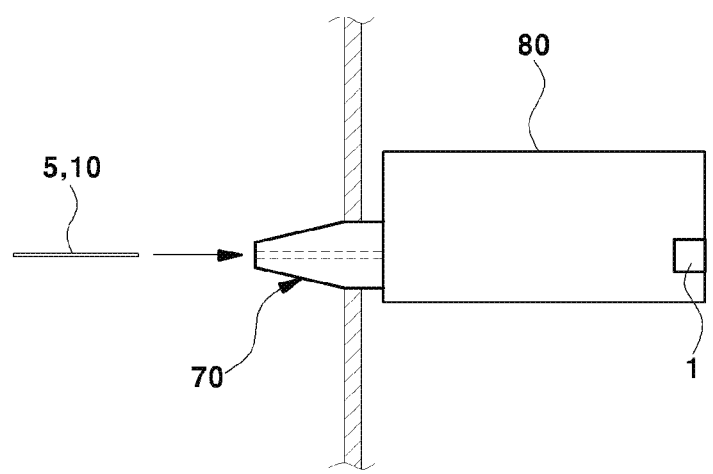
FIG. 2 is a view illustrating a card skimming prevention device according to an embodiment of the present invention.

FIG. 1 is a view illustrating an automated teller machine in which a card skimming prevention device is housed according to an embodiment of the present invention, and FIG. 2 is a view illustrating a card skimming prevention device according to an embodiment of the present invention.

Referring to FIGS. 1 and 2, the card skimming prevention device 1 may be housed in an automated teller machine 50. The card skimming prevention device 1 may detect a card skimmer 5 inserted through a card slot 70 of the automated teller machine 50. The card skimmer prevention device 1 may detect whether an object is inserted into or ejected from the card slot 70 using the radar sensor and detect a user 30 positioned in front of the automated teller machine 50. In this case, the user 30 may mean a person who inserts an object into the automated teller machine 30. The object may be the card 10 or the card skimmer 5. The card skimming prevention device 1 may detect that the user 30 is located in front of the automated teller machine 50 and then is moving away from the automated teller machine 50. That is, the card skimming prevention device 1 may detect that the user 30 is positioned adjacent to the automated teller machine 50 to use the automated teller machine 50 and the user moves away from the position after completing the use of the automated teller machine 50.

The automated teller machine 50 may include a card slot 70 and a card processing unit 80. The card 10 or the card skimmer may be inserted through the card slot 70. The card processing unit 80 may recognize a magnetic field of the card and an IC chip of the card 10 to read information of the card 10. The card skimming prevention device 1 according to an embodiment of the present invention may be located in the card processing unit 80. However, the position where the card skimming prevention device 1 is disposed is not particularly limited and may be disposed inside or outside the automated teller machine 50. The card skimmer 5 may not be ejected after being inserted into the card slot 70. When the card 10 is inserted after the card skimmer 5 is inserted, the card skimmer 5 reads information of the card 10. In other words, the card skimmer 5 acquires the card information necessary for card skimming. Therefore, it is necessary to recognize that the card skimmer 5 is inserted and thus prevent the card 10 from being skimmed. The card skimming prevention device 1 according to an embodiment of the present invention may detect that the card skimmer 5 is inserted into the card slot 70, thereby preventing the information of the card 10 from being leaked.

FIG. 3 is a block diagram illustrating a card skimming prevention device according to an embodiment of the present invention.

Referring to FIGS. 1 to 3, the card skimming prevention device 1 may include a sensor unit 100, a control unit 200, an output unit 300, and a storage unit 400. The sensor unit 100, the control unit 200, and the output unit 300 may be modularized as a unit and disposed in the card processing unit 80 of the automated teller machine 50 or inside or outside the automated teller machine 50. The storage unit 400 may be modularized together with the sensor unit 100, the control unit 200, and the output unit 300 and may be configured as a separate server or database.

The sensor unit 100 may detect the movement of an object 5 or 10 inserted into or ejected from the card slot 70 of the automated teller machine 50 and the user 30 that inserts the object 5 or 10. In this case, the object 5 or 10 may be the card skimmer 5 or the card 10. The sensor unit 100 may measure the distance between the object 5 or 10 and the sensor unit 100 to detect that the object 5 or 10 is inserted into the card slot 70 and ejected therefrom. The sensor unit 100 may be any one of an impulse-radio ultra-wideband (IR-UWB) communication sensor, a Lidar, a frequency modulated continuous wave (FMCW) radar, and a Doppler radar. Preferably, the sensor unit 100 may be an IR-UWB communication sensor. The UWB communication refers to radio technology that uses a frequency band of 500 MHz or more, or is defined as a signal having a fractional bandwidth of at least 25%. The fractional bandwidth means the bandwidth of the signal compared to its center frequency. The UWB communication is a radio technology that uses broadband frequencies, and has various advantages such as high range resolution, transmittance, strong immunity to narrowband noise, and coexistence with other devices sharing frequency. For example, the UWB communication has the advantage of detecting minute movements of an object because of ultra-precise distance resolution characteristics of 1 cm or less.

An impulse-radio ultra-wideband radar (hereinafter, referred to as, "UWB radar") technology is a system in which the UWB communication technology is combined with radar and refers to a radar technology that transmits a very short duration-impulse signal having a wideband characteristic in a frequency domain and receives a signal reflected from objects and people thereby recognizing the surrounding situation. The UWB radar system generates an impulse signal with a time width of several nanoseconds to several picoseconds in the signal generator and emits the signal at a wide angle or narrow band angle through a transmitting antenna. The emitted signal is reflected by various objects or people in the environment, and the reflected signal may be converted to a digital signal through a receiving antenna and an analog-to-digital converter (ADC).

The control unit 200 detects the movement of the object 5 or 10 detected by the sensor unit 100 and the user 30 inserting the object 5 or 10 and determines whether or not the card skimmer 5 is inserted through the card slot 70. Specifically, the control unit 200 may determine whether or not the card skimmer 5 has been inserted through the card slot 70 based on whether or not the object 5 or 10 is ejected after the object 5 or 10 is inserted.

For example, when the object 5 or 10 is not ejected after the object 5 or 10 is inserted into the card slot 70, the control unit 200 may determine that the card skimmer 5 is inserted in the card slot 70. Herein, when the sensor unit 100 detects that the user 30 is not located in front of the automated teller machine 50, the control unit 200 may determine that the user 30 inserts the card skimmer 5 into the card slot 70 of the automated teller machine 50 and then moves away from the automated teller machine 50.

For example, when the object 5 or 10 is ejected after the object 5 or 10 is inserted into the card slot 70, the control unit 200 determines that the card 10 is inserted into the card slot 70 and then ejected. The control unit 200 may determine that the user 30 has inserted the card 10 in order to use the automated teller machine 50.

For example, the sensor unit 100 detects a user 30 located in front of the automated teller machine 50 when the object 5 or 10 is inserted. The sensor unit 100 may detect that another user inserts another object in a state that the object 5 or 10 is not ejected. Herein, the control unit 200 may determine that the object 5 or 10 is the card skimmer 5 when another object is inserted into the card slot 70. In this example, the object 5 or 10 may be the first object and the other object may be the second object. In this example, the user 30 may be a first user, and the other user may be a second user. That is, the first user may be a subject inserting the first object, the second user may be a subject inserting a second object, and the second user may be a user who uses the automated teller machine 50 in an order subsequent to the first user. Generally, when the card 10 is inserted into the card slot 70 and then is not ejected therefrom, no other card may be inserted into the card slot 70. Accordingly, when the second object is inserted in a state that the first object is inserted into the card slot 70, the control unit 200 may determine that the first object is the card skimmer 5.

The control unit 200 determines whether the object 5 or 10 inserted into the card slot 70 is the card 10 or the card skimmer 5 on the basis of the distance between the card 10 and the sensor unit 100 when the card 10 is inserted. For example, when the card 10 is inserted, the distance between the card 10 and the sensor unit 100 may be 10 cm, and when the card skimmer 5 is inserted, the distance between the card skimmer 5 and the sensor unit 100 may be 12 cm. Herein, when the control unit 200 determines that the distance between the object 5 or 10 and the sensor unit 100 is different from a predetermined reference distance, it is determined that the card skimmer 5 is inserted in the card slot 70.

When the control unit 200 determines that the card skimmer 5 is inserted in the card slot 70, the output unit 300 may output a warning message. For example, the output unit 300 may output a warning sound or transmit a warning message to a terminal located outside the automated teller machine 50 using a wireless communication scheme. In this case, the terminal may be a terminal owned by an administrator managing the automated teller machine 50. The wireless communication method may include a Bluetooth method, an RF method, a Near Field Communication (NFC) method, and the like. In addition, the wireless communication method may use a signal that the sensor unit 100 outputs to detect the movement of the object 5 or 10 and the movement of the user 30. That is, the wireless communication method may be a method of outputting a signal through an IR-UWB communication sensor, a Lidar, a frequency-modulated continuous wave radar (FMCW RADAR), and Doppler radar.

The storage unit 400 may store the distance between the card 10 and the sensor unit 100 when the card 10 is inserted and the distance between the card skimmer 5 and the sensor unit 100 when the card skimmer 5 is inserted. The storage unit 400 includes information on the distance between the sensor unit 100 and the card 10 and the distance between the card skimmer 5 and the sensor unit 100, which vary depending on the position in which the sensor unit 100 is disposed, a type of the automated teller machine 50, or a type of card skimmer 5.

The storage unit 400 may store information for specifying a user 30 located in front of the automated teller machine 50 to use the automated teller machine 50. As an example, the storage unit 400 may store information to distinguish between a person passing in front of the automated teller machine 50, a person waiting to use the automated teller machine 50, and a person currently using the automated teller machine 50. For example, the storage unit 400 may include a minimum time to use the automated teller machine 50, information on a signal pattern obtained by detecting a person passing in front of the automated teller machine 50, and information on a signal pattern obtained by detecting a plurality of persons waiting to use the automated teller machine 50. The control unit 200 may determine that when a certain person is detected to be in front of the automated teller machine 50 for period of time less than a predetermined minimum time on the basis of the information stored in the storage unit 400, the person is not the user 30. In addition, the control unit 200 may analyze a signal pattern obtained by detecting the user 30 and a person in an order subsequent to the user 30 and the user 30 to determine which one is the user 30 using the automated teller machine 50.

According to an embodiment of the present invention, it is possible to determine whether the object 5 or 10 inserted into the card slot 70 is the card 10 or the card skimmer 5 using a radar sensor. Specifically, the sensor unit 100 that is configured with a radar sensor detects the distance to the object 5 or 10, and the control unit 200 determines whether the card skimmer 5 is attached to the automated teller machine 50 on the basis of whether the object 5 or 10 is ejected from the card slot 70. Therefore, it is possible to prevent the card skimmer 5 from being attached in advance and thus avoid causing financial damage to a user.

Also, the card skimming prevention device 1 according to an embodiment of the present invention may be implemented more easily compared with a method of generating a separate magnetic field to prevent the card skimmer 5 attached to the automated teller machine 50 from being operated, whereby it is possible to be operated at a low power and implemented at a low cost.

Also, according to an embodiment of the present invention, the card skimming prevention device 1 may detect the card skimmer 5 that is inserted into the card slot 70 and thus is not visually recognized.

FIG. 4 is a view illustrating the arrangement of a sensor unit according to an embodiment of the present invention.

Referring to FIGS. 2 and 4, the sensor unit 100a and 100b may be disposed within the card processing unit 80. One or a plurality of the sensor units 100a and 100b may be provided. The sensor units 100a and 100b may be the first sensor unit 100a disposed on the side surface of the card processing unit 80 and/or the second sensor unit 100b disposed on the bottom surface of the card processing unit 80, respectively. The first sensor unit 100a may be disposed in a direction in which the object 5 or 10 is inserted. The first sensor unit 100a may output a laser pulse toward the card slot 70 and then receive a signal reflected by the object 5 or 10. The first sensor unit 100a may measure the first distance d1 between the object 5 or 10 and the first sensor unit 100a via the reflected signal. The second sensor unit 100b may be disposed on the bottom surface of the card processing unit 80. The second sensor unit 100b may be disposed within the card processing unit 80 at a height lower than a height at which the object 5 or 10 is inserted. The second sensor unit 100b may measure the second distance d2 between the object 5 or 10 and the second sensor unit 100b when the object 5 or 10 is inserted and measure the distance between the second sensor unit 100b and other component within the card processing unit 80 when the object 5 or 10 is not inserted. Accordingly, the second sensor unit 100b may detect whether the object 5 or 10 is inserted or ejected.

Unlike the above example, the positions where the first sensor unit 100a and the second sensor unit 100b are disposed may not be limited. However, it is possible to detect whether the object 5 or 10 is inserted or ejected from the first sensor unit 100a and the second sensor unit 100b, and determine whether the inserted object 5 or 10 is the card 10 or the card skimmer 5.

Figure 5:
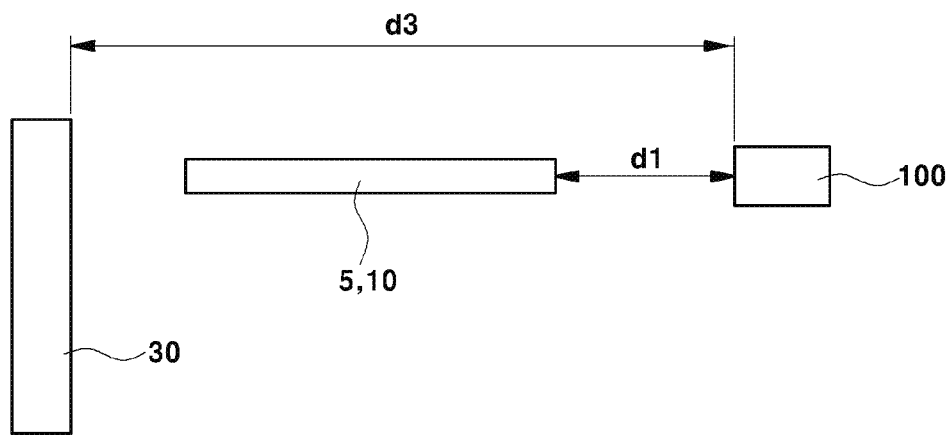
FIG. 5 is a view illustrating a detection range of a sensor unit according to an embodiment of the present invention.

FIG. 5 is a view illustrating a detection range of a sensor unit according to an embodiment of the present invention.

Referring to FIGS. 1, 2, 3, and 5, the sensor unit 100 detects a first distance d1 from the object 5 or 10 and a third distance d1 from the user 30 located in front of the automated teller machine 50 d3. The third distance d3 may be longer than the first distance d1. For example, the first distance d1 may be 10 cm to 20 cm, and the third distance d3 may be 50 cm to 1 m. However, the first distance d1 and the third distance d3 may not be particularly limited and may be a distance capable of being changed by a designer. The sensor unit 100 may receive two signal patterns using a single wavelength. That is, the sensor unit 100 may detect the movement of the object 5 or 10 spaced at the first distance d1 and the movement of the user 30 spaced at the third distance d3 by outputting one wavelength. The sensor unit 100 may distinguish the object 5 or 10 from the user 30 via the size of the received signal, the band of the received signal, and the pattern of the received signal.

The sensor unit 100 may detect whether the object 5 or 10 is inserted into the card slot 70 and ejected therefrom. The control unit 200 may determine whether or not the card skimmer 5 is inserted into the card slot 70 on the basis of the first distance d1 and whether or not the object 5 or 10 is ejected. Herein, when the user 30 is not detected in front of the automated teller machine 50 and the object 5 or 10 is not ejected from the card slot 70, then the control unit 200 determines that the user 30 inserts the card skimmer 5 into the card slot 70 and then moves away.

Figure 6:
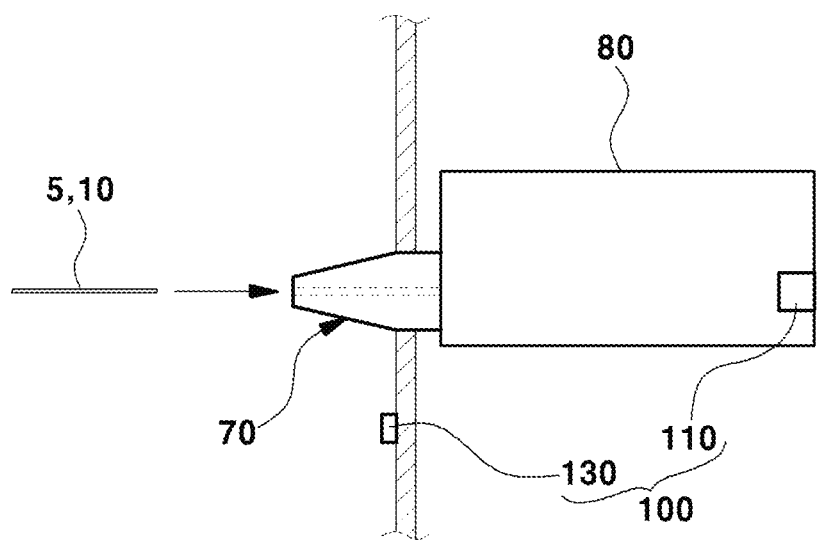
FIG. 6 is a view illustrating a card skimming prevention device according to another embodiment of the present invention.

FIG. 6 is a view illustrating a card skimming prevention device according to another embodiment of the present invention. For the sake of simplicity of description, description of redundant contents is omitted.

Referring FIGS. 1, 3, and 6, the sensor unit 100 includes a first sensor unit 110 disposed inside the automated teller machine 50 and a second sensor unit 130 disposed outside the automated teller machine 50. For example, the first sensor unit 110 may be disposed in the card processing unit 80, and the second sensor unit 130 may be disposed on the outer wall of the automated teller machine 50. However, the space in which the first sensor unit 110 and the second sensor unit 130 are disposed may not be particularly limited.

The first sensor unit 110 may detect the distance to the object 5 or 10 and the second sensor unit 130 may detect the distance to the user 30 located in front of the automated teller machine 50. That is, the first sensor unit 110 may detect the movement of the object 5 or 10, and the second sensor unit 130 may detect the movement of the user 30. The control unit 200 may determine whether or not the card skimmer 5 is inserted into the card slot 70 on the basis of information detected by the first sensor unit 110 and the second sensor unit 130.

The control unit 200 determines whether the object 5 or 10 inserted into the card slot 70 is the card 10 or the card skimmer 5 on the basis of the information stored in the storage unit 400 and the information detected by the first sensor unit 110. The control unit 200 may determine the user 30 using the automated teller machine 50 among a plurality of persons detected in front of the automated teller machine 50 on the basis of the information stored in the storage unit 400 and the information detected by the second sensor unit 130.

Figure 7:
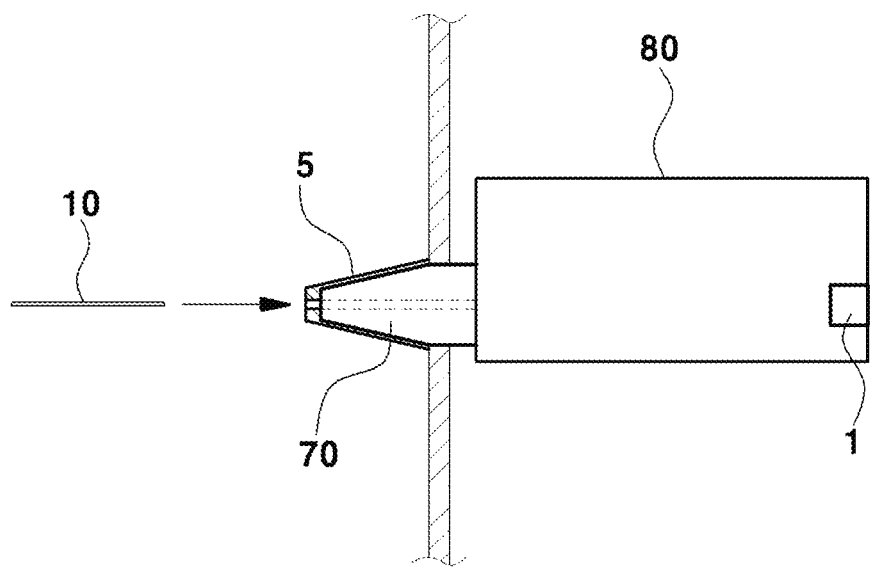
FIG. 7 is a view illustrating a card skimming prevention device according to another embodiment of the present invention.

FIG. 7 is a view illustrating a card skimming prevention device according to another embodiment of the present invention. For the sake of simplicity of description, description of redundant contents is omitted.

Referring to FIGS. 1, 3, and 7, the card skimmer 5 may be configured in such a manner as to be attached to the card slot 70. The card skimming prevention device 1 may be disposed within the automated teller machine 50. The sensor unit 100 may detect the card skimmer 5 attached to the card slot 70 of the automated teller machine 50. The storage unit 400 may store information such as the distance between the sensor unit 100 and the card slot 70 and the signal pattern reflected by the interface between the card slot 70 and the air. The control unit 200 may analyze the signal reflected by the card skimmer 5 detected by the sensor unit 100 on the basis of the information stored in the storage unit 400 to determine whether the card skimmer 5 is attached or not. Specifically, the control unit 200 compares the signal received by the sensor unit 100 with the signal reflected by the interface between the card slot 70 and the air stored in the storage unit 400 to determine whether or not the card skimmer 5 is attached to the card slot 70.

According to an embodiment of the present invention, the card skimming prevention device 1 may determine whether or not a separate configuration is attached to the card slot 70. Accordingly, the card skimming prevention device 1 may determine whether or not the card skimmer 5 is attached to the card slot 70 to copy information of the card 10, and when it is determined that the card skimmer 5 is attached, inform the same of the outside.

While the present invention has been described in connection with accompanying drawings, it will be understood by those skilled in the art that the present invention may be embodied in other specific forms without departing from the spirit or essential characteristics thereof. Therefore, it will be understood that the above-described embodiments are illustrative in all aspects and not restrictive.

What is claimed is:

1. A card skimming prevention device, comprising:
    a sensor unit configured and arranged for detecting a movement of an object inserted into or ejected from a card slot of an automated teller machine (ATM) and a user who inserts the object, the sensor unit having at least one of an impulse-radio ultra-wideband (IR-UMB) communication sensor, a Lidar, a frequency modulated continuous wave (FMCW) radar, and a Doppler radar; and
    a control unit configured and arranged for determining whether or not a card skimmer is inserted into the card slot on basis of whether or not the object is ejected after the object is inserted,
    wherein the sensor unit detects whether the object is inserted into the card slot or ejected from the card slot via a distance from the object inserted into the card slot,
    wherein when another object inserted into the card slot is detected in a state that the object is inserted into the card slot, the control unit determines that the object is a card skimmer.

2. The card skimming prevention device according to claim 1, wherein the control unit determines that the object is the card skimmer when the user is not detected in front of the automated teller machine while the object is not ejected from the card slot.

3. The card skimming prevention device according to claim 1, wherein the control unit determines that the object is a card when the object is ejected from the card slot.

4. The card skimming prevention device according to claim 1, wherein the sensor unit detects a first user located in front of the automated teller machine when inserting a first object and detects that a second user inserts a second object into the card slot in a state that the first object is not ejected, and
    the control unit determines that the first object is the card skimmer when the second object is inserted into the card slot.

5. The card skimming prevention device according to claim 1, wherein the sensor unit is disposed inside the automated teller machine, and the sensor unit is disposed in a direction in which the object is inserted.

6. The card skimming prevention device according to claim 1, wherein the sensor unit is disposed inside the automated teller machine, and the sensor unit is disposed inside the automated teller machine at a height lower than a height at which the object is inserted.

7. The card skimming prevention device according to claim 1, wherein the sensor unit detects that the card skimmer is attached to the card slot of the automated teller machine, and
    the control unit compares a signal reflected by the card slot with a signal reflected by the card skimmer to determine whether or not the card skimmer is attached.

8. The card skimming prevention device according to claim 7, further comprising a storage unit configured and arranged for storing information on a pattern of the signal reflected by the card slot,
    wherein the control unit analyzes the signal reflected by the card skimmer that is detected to be attached to the card slot by the sensor unit, on basis of the information stored in the storage unit.

9. The card skimming prevention device according to claim 1, further comprising a storage unit configured and arranged for storing at least one of a minimum time to use the automated teller machine, information on a signal pattern obtained by detecting a person passing in front of the automated teller machine, and information on a signal pattern obtained by detecting a plurality of persons waiting to use the automated teller machine,
    wherein the control unit determines the user using the automated teller machine on basis of the information stored in the storage unit.

10. The card skimming prevention device according to claim 1, wherein the control unit analyzes the movement of the object spaced at a first distance from the sensor unit and a movement of the user spaced at a second distance from the sensor unit to determine whether or not the object is the card skimmer, and
    the second distance is longer than the first distance.

11. The card skimming prevention device according to claim 1, wherein the sensor unit includes a first sensor unit detecting the movement of the object and a second sensor unit detecting a movement of the user.

12. The card skimming prevention device according to claim 1, further comprising an output unit configured and arranged for outputting a warning message when the control unit determines that the object is the card skimmer.

* * * * *